July 7, 1964  B. L. WINDES  3,140,389
PLATE WARMER
Filed July 13, 1962
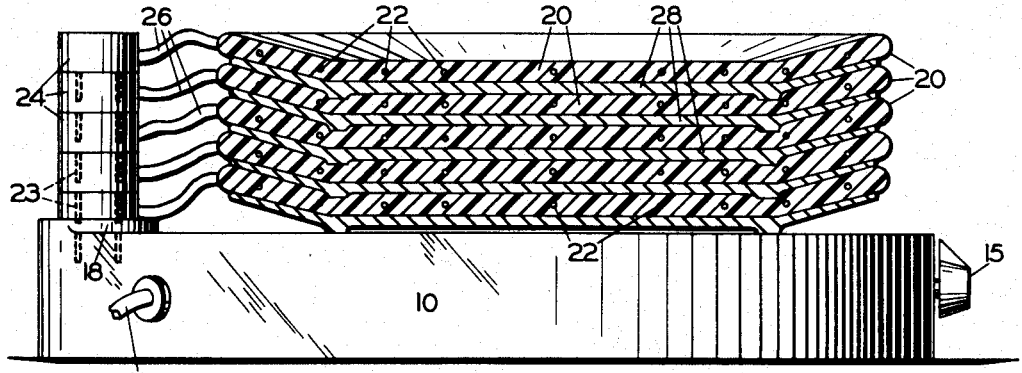
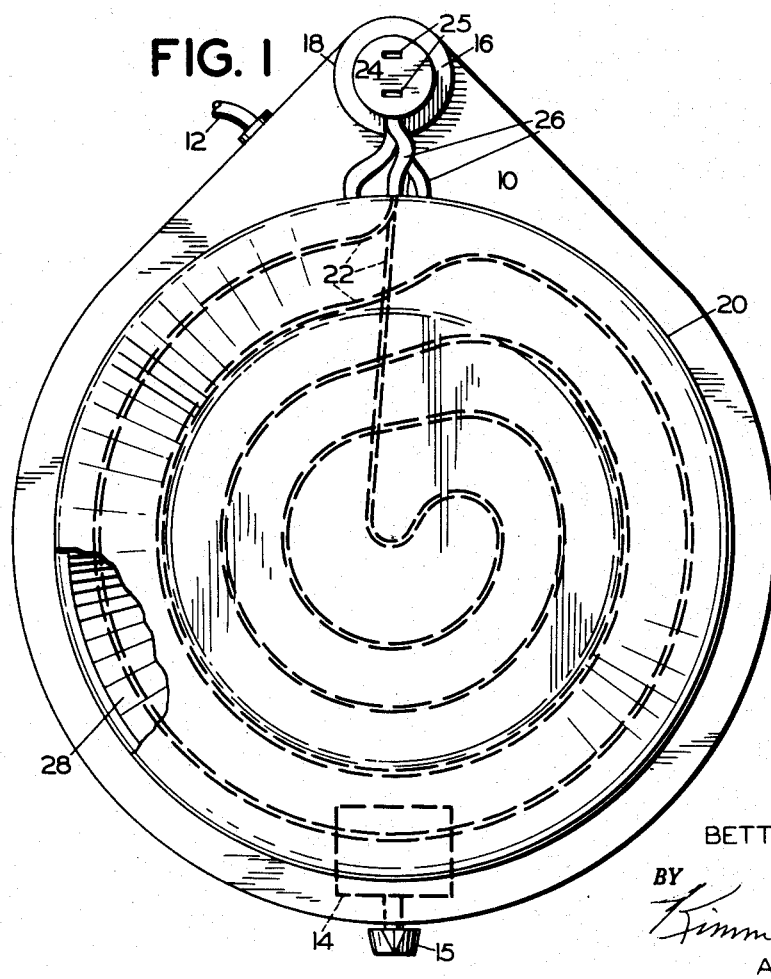
INVENTOR.
BETTE L. WINDES
BY
ATTORNEYS

United States Patent Office 3,140,389
Patented July 7, 1964

3,140,389
PLATE WARMER
Bette L. Windes, 5121 SW. 26th Drive, Portland, Oreg.
Filed July 13, 1962, Ser. No. 209,632
1 Claim. (Cl. 219—447)

This invention relates to a plate warmer, and more particularly to an improvement in a device with which to warm plates, dishes and the like.

A primary object of this invention is the provision of an improved device for the pre-heating of plates, dishes and the like before serving food thereon, under conditions when a pre-heated plate adds to the overall palatability of the foods being served.

A more specific object of this device resides in providing a multiplicity of flexible rubber or plastic covered disks containing warming elements which are alternately placed between the plates, or dishes, to accomplish the desired warming, the flexible warming disks permitting the accommodation of various size and shaped plates, or dishes.

A further object resides in providing each flexible warming disk with its own plug to connect same to a central power source, thus allowing the use of only the number of warming disks actually needed at one time. In addition, all the warming disks may be disconnected and stowed in a convenient and safe place when not in use.

Another object is the inclusion of a thermostat control to provide for different warming temperatures, when desired.

Still other objects will in part be obvious and in part be pointed out hereinafter and shown in the accompanying drawing wherein:

FIGURE 1 is a top plan view of this device in operation partially sectioned; and FIGURE 2 is a side elevation, partially in section, wherein the arrangement of plates and warming disks is shown.

Similar reference characters refer to similar parts throughout the several views of the drawing.

The device of the instant invention consists of a base or body member 10 constructed of suitable material to provide an attractive appearance. Located within body 10 is conventional electrical wiring (not shown) rendering this device operable, as will be explained later. The electric wiring is supplied with electric current from a lead-in wire 12 which is connected to a thermostat control 14 which, in turn, by adjustment of a control knob 15, controls the power supply to an outlet plug 16, located in a raised portion 18 on the upper surface of body 10. Raised portion 18 protects the outlet plug 16 from moisture when cleaning this device. Suitable plastic or rubber covered flexible warming disks 20 having internally positioned individual heating elements 22 are connected to the outlet plug 16 by their individual connecting plugs 24. Each connecting plug 24 has a pair of male prongs 23 on its lower surface and a corresponding pair of female sockets 25 on its upper surface. This type of connecting plug 24 allows a multiplicity of such plugs 24 to be stacked one upon another.

Each connecting plug 24 is attached to its companion heating element 22 of each disk 20 by an individual connecting lead wire 26. The height of each connecting plug 24 is such that, when each disk 20 is stacked upon a related plate 28, the disk 20 is in proper position, that each connecting lead wire 26 is of substantially equal length to all of the other lead wires 26. By this method, each disk 20 is positioned at the same height as its corresponding connecting plug 24. This arrangement insures against excessive wear of the connecting lead wires 26 such as might occur if some were longer than others. Further, a more attractive and neater appearing appliance is presented.

In the operation and use of this device, base 10 and its associated wiring is connected to the electric power supply by lead-in wire 12. Thermostat control 14 is then set by knob 15 for the desired degree of temperature. Next, the appropriate number of plates, or dishes, 28 is selected that will be required for a given meal. Then the number of warming disks 20 is selected with which to warm the aforementioned plates 28.

Viewing FIGURE 2, a plate 28 is first placed and positioned directly on top of the body or base member 10. Next, a heating disk 20 is placed on top of the first plate 28, then another plate 28 is added and then another heating disk 20, and so on, until all of the needed plates 28 are covered with a heating disk 20. As each disk 20 is added, its connecting plug 24 is connected to the previous connecting plug 24 with the first, or lowest, plug 24 inserted into the outlet plug 16. This arrangement provides a parallel electric circuit, thus allowing the use of all, or any portion, of the total number of the disks 20 to be used.

As many embodiments may be made of this inventive concept, and as many modifications may be made in the embodiment hereinbefore shown and described, it is to be understood that all matter herein is to be interpreted merely as illustrative, and not in a limiting sense.

I claim:

A plate warmer comprising a substantially circular base of a diameter completely to support a plate, including a radially offset portion, a female socket carried by the upper surface of said offset portion, wiring in said base for connecting said socket with a source of electricity, a plurality of removable plugs having flat superposable upper and lower surfaces, each plug having a female socket in its upper surface and male prongs depending from its lower surface, the male prongs of any plug being selectively insertable in any of said female sockets including said female socket carried by the offset portion of said base, whereby all of said plugs may be interchangeably connected with said source of electricity and interconnected with each other, a plurality of identical flexible warming pads each of a diameter completely overlying a plate, a heating element in each pad, a connection of identical length between each element and its respective plug, and a controlable thermostat carried by said base.

References Cited in the file of this patent
UNITED STATES PATENTS

| | | |
|---|---|---|
| 1,425,837 | Clark | Aug. 15, 1922 |
| 1,617,810 | Hubbell | Feb. 15, 1927 |
| 1,940,172 | Hybinette | Dec. 19, 1933 |
| 2,139,153 | Frolich | Dec. 6, 1938 |
| 2,162,021 | Kidwell | June 13, 1939 |
| 2,448,339 | Williams | Aug. 31, 1948 |
| 2,802,091 | MacKendrick | Aug. 6, 1957 |
| 2,866,956 | Miller et al. | Dec. 30, 1958 |
| 3,041,441 | Elbert et al. | June 26, 1962 |

FOREIGN PATENTS

| | | |
|---|---|---|
| 624,615 | France | Apr. 11, 1927 |